Figure 1:
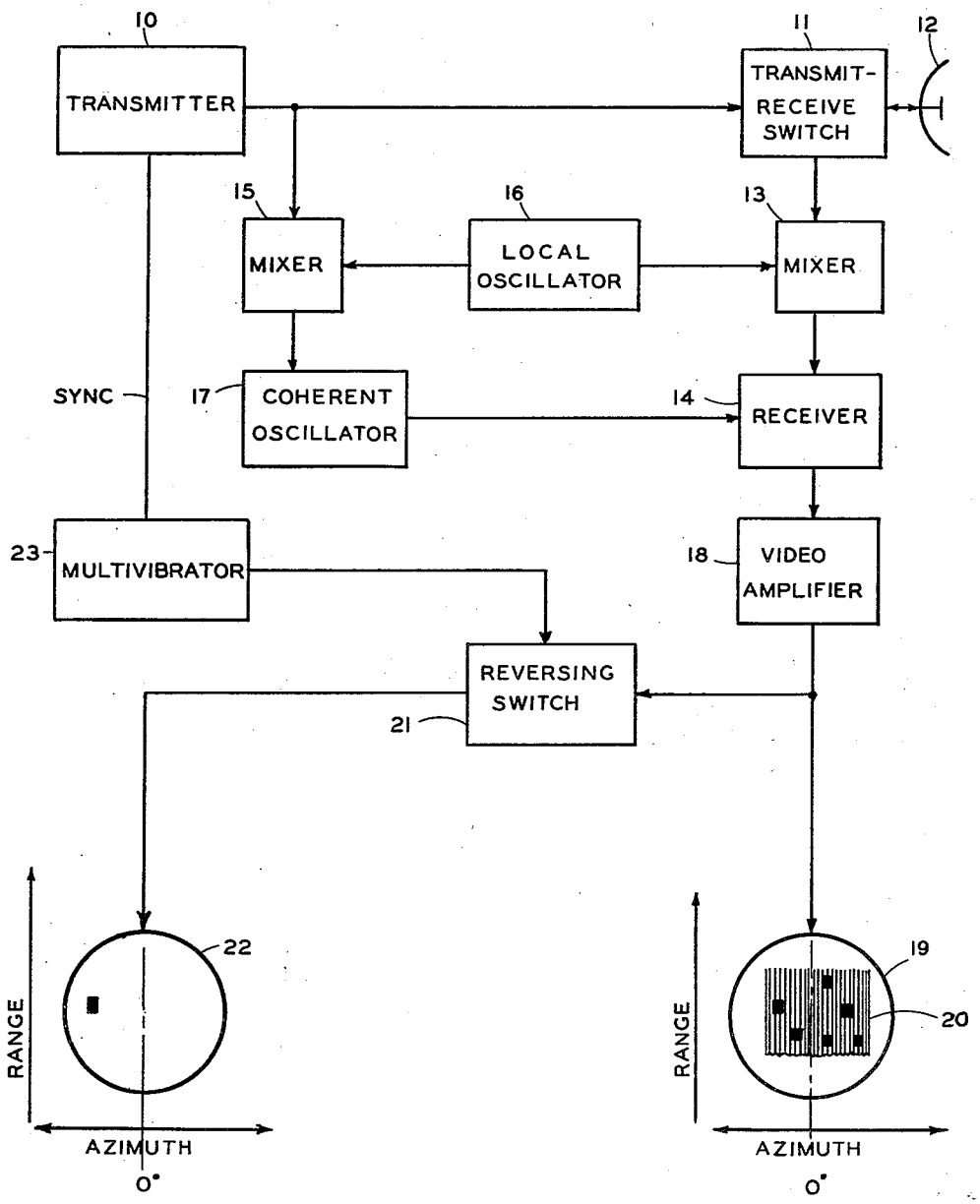

Dec. 21, 1954    R. H. DICKE    2,697,826
MOVING TARGET INDICATING SYSTEM
Filed May 8, 1946    2 Sheets—Sheet 2

INVENTOR
ROBERT H. DICKE

BY
William D. Hall
ATTORNEY

United States Patent Office

2,697,826
Patented Dec. 21, 1954

2,697,826

MOVING TARGET INDICATING SYSTEM

Robert H. Dicke, Princeton, N. J., assignor, by mesne assignments, to United States of America as represented by the Secretary of War Application May 8, 1946, Serial No. 668,117

10 Claims. (Cl. 343—7.7)

The present invention pertains generally to a radio object-locating system of the pulse echo type adapted to differentiate between fixed and moving objects and is more particularly directed to an arrangement in conjunction with said system for eliminating all fixed object indications from the viewing screen of the system indicator.

In conventional radio object-locating systems wherein an exploratory beam of radio pulses is projected in space, the echo pulses received from reflecting objects serve as an index to the respective locations of the objects. With conventional systems echo pulses received from buildings, hills, trees, and other fixed objects frequently interfere with the discernment of moving object echo pulses on the viewing screen of the visual indicator. This type of interference is commonly designated as "ground clutter." Accordingly, systems have been devised, based on the Doppler effect resulting from a moving object, enabling an observer to distinguish between fixed and moving objects. The operation of these systems is dependent on the nature of the video pulses derived from echo pulses returning from reflecting objects.

In general terms existing systems for distinguishing fixed objects from moving objects, each at least include a transmitter and an associated receiver, the transmitter being adapted to furnish successive, brief pulses of high frequency oscillations synchronized in fixed phase relation with respect to reference oscillations generated locally at the receiver. The oscillations contained within the echo pulses returning from an object have a certain phase relation with respect to the reference oscillations, the relative phase being dependent upon the instantaneous range of the object and varying with the radial component of the velocity thereof.

In the case of an object in motion, the resultant change in range causes the relative phase to shift from pulse to pulse. It will be evident that if the echo pulses are algebraically combined with the reference oscillations they will reinforce or oppose each other to a degree varying in accordance with the relative phase therebetween. By detecting the resultant algebraic combination, video pulses are developed, the amplitude of said video pulses being a function of said relative phase. Since in the case of moving objects the phase of successive echoes relative to reference oscillations undergoes continuous variation, the amplitude of the resulting successive video pulses vary in a cyclical manner as the relative phase shifts progressively from phase coincidence to phase opposition.

On the other hand, fixed objects reflect successive echo pulses having an unchanging phase relative to the reference oscillations; therefore the resultant video pulses have a constant amplitude.

For a more detailed description of a system of the character described, reference may be had to the copending application of Robert H. Dicke, Serial No. 590,052, filed April 24, 1945, entitled "Communication System," issued December 26, 1950, as Patent No. 2,535,274.

In certain object locating applications where only moving objects are of interest to an observer, it is desirable to remove completely all ground clutter from the viewing screen of the indicator and some arrangement adapted to perform this function is entailed. Heretofore it was the practice for this purpose to provide means for comparing successive pulses in order to determine the amplitude difference existing between them. By arranging the indicator to be responsive solely to said amplitude difference, only moving object indications are permitted to appear thereon. It was therefore necessary, in order to compare a first pulse with a second pulse occurring a predetermined time thereafter, to delay the first pulse for a period equal to the time interval between pulses. This delay operation usually involved expensive and cumbersome delay line apparatus. For example, one such apparatus comprises a pair of piezoelectric crystal supersonic oscillators contained in spaced relation in a mercury transmitting medium, the delay time being a function of the transmitting path between the crystals.

In view of the disadvantages attending the use of delay lines in a system of the character described, it is the main object of this invention to provide relatively simple and inexpensive means in conjunction with said system adapted to eliminate stationary object indications from the screen of the indicator. More specifically, it is an object of this invention to provide means for reversing the polarity of alternate video pulses applied to an indicator arrangement in said system whereby video pulses derived from ground clutter are effectively cancelled by said indicator while moving object video pulses are presented thereon.

For a better understanding of the invention as well as for other objects and features thereof, reference is had to the following detailed description to be read in connection with the accompanying drawings wherein:

Fig. 1 is a block diagram of one preferred embodiment of an object locating system in accordance with the invention; and Figs. 2, 3, 4, 5 and 6 are curves explanatory of various aspect of the invention.

Referring now to the drawings and more particularly to Fig. 1, a system is shown adapted to distinguish moving objects from ground clutter, the system comprising a radio transmitter 10 for generating high frequency exploratory pulses which are fed through a transmit-receive switch 11 to a suitable directional scanning antenna 12. Means (not shown) are provided for rotating antenna 12 in azimuth at a uniform speed whereby all objects within range of the system are scanned. A receiving channel is associated with antenna 12, said channel including a mixer 13 having one input circuit connected to transmit-receive switch 11, the output circuit thereof being connected to receiver 14.

The transmit-receive switch 11 functions during the transmission periods of exploratory pulses to couple transmitter 10 to antenna 12 and to simultaneously disconnect the receiving channel. In the interim between pulses, the transmit-receive switch 11 functions to disconnect transmitter 10 from antenna 12 and couple the antenna to the receiving channel. A small portion of each of the transmitted pulses is applied to one input circuit of a mixer 15, the other input circuit being connected to a local oscillator 16. The beat frequency output of mixer 15 is then applied as a synchronizing pulse to a coherent oscillator 17 which is an oscillator generating intermediate frequency reference oscillations having a fixed phase relation, that is to say, in coherence with respect to the transmitted exploratory pulses.

During reception periods, echo pulses received by antenna 12 are fed through transmit-receive switch 11 to one input circuit of mixer 13, the other input circuit being connected to local oscillator 16. The beat frequency output of mixer 13 consists of echo pulses having a frequency substantially equal to the frequency of the reference oscillations issuing from coherent oscillator 17 but displaced in phase therefrom as a function of the component of radial velocity of the reflecting object. The output from mixer 13 and the reference oscillations from coherent oscillator 17 are then applied to receiver 14.

The echo pulses and reference oscillations are combined in a linear mixer (not shown) in receiver 14 and the resultant is detected therein to provide video pulses. The output of receiver 14 consists of two distinct types of video pulses; one type consists of video pulses representing fixed objects and having substantially constant amplitudes, whereas the second type consists of those video pulses representing moving objects by varying in amplitude as a function of the radial component of object velocity.

The ratio between the pulse repetition rate of transmitter 10 and the cyclical rate of rotation of antenna 12 in this system is such that a train of echoes is received from each reflecting object in the course of an antenna scanning cycle.

The video output from receiver 14 is applied through a suitable video amplifier 18 directly to a cathode ray oscilloscope indicator 19 which is preferably arranged to present a so-called "B" type presentation of range versus azimuth. This is conventionally accomplished with magnetic deflection of the beam which is intensity modulated by the video voltage to cause the position of the object to be indicated by a bright spot on the screen. As shown by pattern 20, the scan covers a rectangular area on the screen whereon the range is swept vertically and the azimuth horizontally, the reflecting objects being indicated by bright spots. Cathode ray indicator 19 displays all objects within range of the system, making no distinction between moving objects and ground clutter.

The output of video amplifier 18 is also fed through a reversing switch 21 to a second cathode ray indicator 22 likewise adapted to display a "B" type presentation. However, the arrangement in this case is such that indicator 22 displays only moving objects, ground clutter being entirely eliminated from the viewing screen. The manner in which this is effected will now be discussed.

Reversing switch 21 is preferably of electronic design and functions to reverse the polarity of video output pulses from amplifier 18 at the time of each pulse transmission from transmitter 10. To accomplish this function, the operation of reversing switch 21 is controlled by a suitable square wave multivibrator 23 whose alternating square wave output is synchronized with the pulse operation of transmitter 10 so that reversing switch 21 functions at the instant of pulse transmission. The behavior of reversing switch 21 is such that it conducts in one direction upon the application of a positive square wave and in the reverse direction upon the application of a negative square wave.

Cathode ray indicator 22 is so biased that when no video pulses are impressed on the intensity grid thereof the fluorescent screen is illuminated at half intensity. Moreover, the beam spot is given an enlarged, somewhat elliptical form, whereby a succeeding vertical range trace of the beam, upon being displaced horizontally in accordance with azimuth, overlaps the preceding vertical trace. As a result, in the absence of an input video pulse, the background illumination on the scope is uniformly at the point of half illumination, no striations appearing thereon due to successive sweeps. Hence a given video pulse applied to the cathode ray tube appears either as a bright spot or a dark spot depending on its polarity. The desired shape of the cathode ray beam spot will be later treated in greater detail.

It will now be evident that if antenna 12 is made to scan slowly in azimuth so that a train of approximately 10 pulses falls on any given fixed object, the overlap of the corresponding sweeps of oscilloscope 22 will have the effect of causing the successive bright and dark spots to cancel each other, the resultant indication being at half illumination and therefore not distinguishable from the trace itself. If, on the other hand, the reflecting target is in motion it is evident that the Doppler effect may entirely eliminate this cancellation, since the returning echoes are not of fixed amplitude. In fact, if the object is moving at the right velocity, the successive pulses fed into cathode ray oscilloscope 22 may have the same polarity and the moving object will be manifested either as a very bright or dark spot on the screen.

It has been found that the above-described behavior of the system is subject to certain conditions of antenna pattern and cathode ray spot shape. In order for there to be complete cancellation of ground clutter on the viewing screen, it is necessary that the antenna pattern and the pattern of illumination of a cathode ray spot be of such form that each can be formed by the algebraic sum of a curve and an identical curve displaced with respect thereto.

Figure 2:
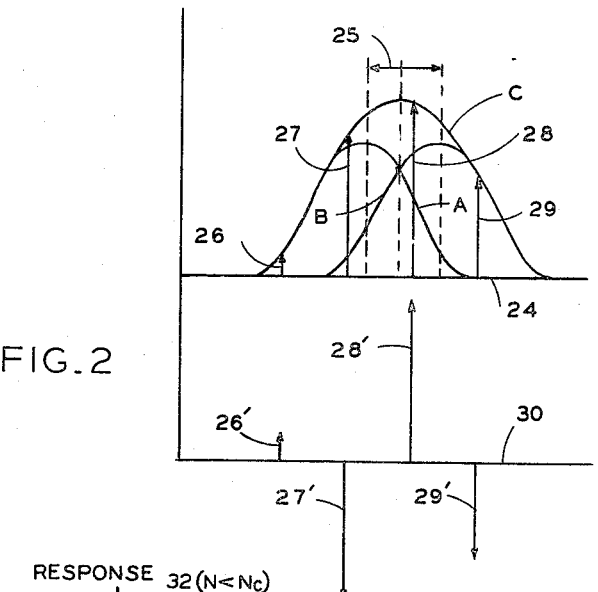

Referring now to Fig. 2, one such pattern which fulfills the above-stated conditions is shown in curve C, which is formed by the algebraic sum of curve A, plotted in arbitrary units of magnitude of intensity as a function of angular units measured along line 24, and an identical curve B which is displaced along the line 24 by an amount denoted by 25 from curve A. Curves A and B, respectively, represent the energy distribution of the beam of cathode ray oscilloscope 22 during successive range traces.

It will be assumed that the pulse repetition rate and the antenna scanning speed is such that a train of four pulses strike a certain object in the course of a scanning cycle. These four pulses are represented by arrows 26, 27, 28 and 29 which are displaced along the angular axis 24 with respect to curve C in such a manner that the ordinates of the curve C at the respective points of occurrence of the arrows is proportional to the field intensity at the object for that specific pulse.

Since in accordance with the principles of the invention alternate video pulses are reversed in polarity, corresponding video pulses 26', 27', 28' and 29' are shown in this manner along reference line 30. It can be shown that the sum of positive pulses 26' and 28' is equal to the sum of negative pulses 27' and 29'. Therefore if the reflecting object is stationary, the relative amplitude of video pulses 26' to 29' remains unchanged, and cancellation will occur on the screen. That is to say the net effect of the applied train of video pulses provides screen illumination at half intensity indistinguishable from the trace illumination. However if the reflecting object is in motion the relative amplitude of the video pulses will vary and an indication will be displayed on the screen in the form of either a relatively dark or a light spot.

Figure 3:
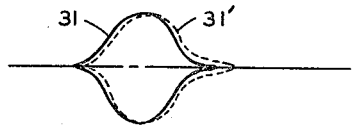

Referring now to Fig. 3 there is shown by curve 31, which is formed by the algebraic addition of two identical curves displaced with respect to each other, the desired shape of the cathode ray beam spot. It will be seen that when the spot is shifted on a succeeding sweep, this position being shown in dotted lines by form 31', the overlap of curve 31' on curve 31 is such that the area of greatest illumination in curve 31 is covered by curve 31'. Hence if the illumination of curve 31' is controlled by a video pulse of the same magnitude but of opposite polarity to the pulse controlling the illumination of curve 31, the result will be a spot at half intensity indistinguishable from the trace. Similarly the train of video pulses derived from a stationary object will result in an indication which is not discernable on the screen. The desired beam spot pattern may be secured by proper shaping of the focusing electrodes of the cathode ray tube.

If it is desired to operate with a very low number of pulses ($n \sim 2.5$) falling on a point object, it has been calculated that the antenna pattern must be of the form $$\frac{\sin X}{X}$$

and the spot illumination of the form $$\left[\frac{\sin X}{X}\right]^2$$

where the X represents an azimuth angle. No special conditions are imposed on the vertical antenna pattern. To a good approximation a Gaussian spot shape may be substituted for $$\left[\frac{\sin X}{X}\right]^2$$

the form of the spot illumination.

Figure 4:
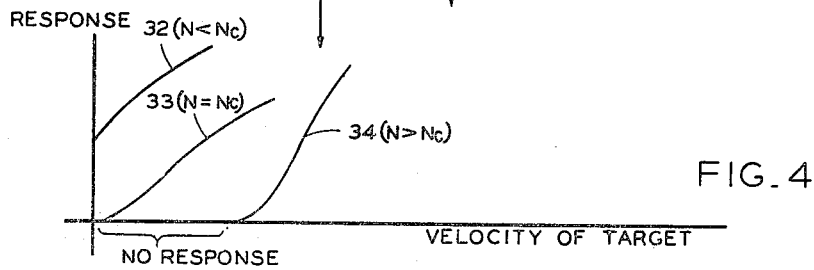

If both the antenna and cathode ray tube spot have forms such that they can be generated by a curve formed by the algebraic addition of two identical curves displaced with respect to each other, then there is some critical antenna scanning speed (number of pulses on a point object) such that for any slower speed all stationary objects are absent from the viewing screen. Moreover, if the conditions of antenna and beam spot pattern are met for a scanning speed less than critical there is an object velocity below which no signals appear on the viewing screen. The magnitude of this critical velocity may be changed by altering the scanning speed. In Fig. 4, three such conditions are illustrated, curves being plotted for varying degrees of object velocity versus screen response. Curve 32 is plotted for the condition where the number of pulses per object N is less than the critical number of pulses per object $N_c$; curve 33 is plotted for the condition where the number of pulses per object is equal to the critical number of pulses per object; curve 34 is plotted for the condition where the number of pulses per object is greater than the critical number of pulses per object.

Figure 5:
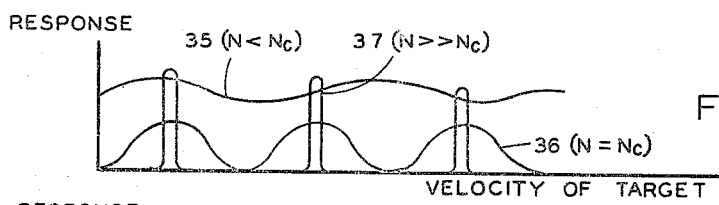
Figure 6:
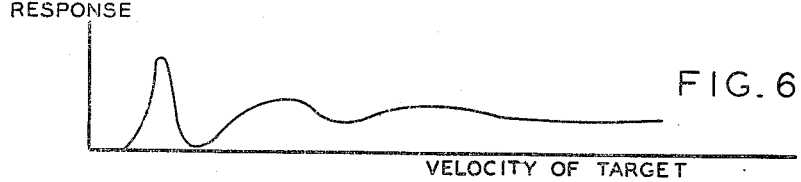

Referring now to Fig. 5 there is shown three curves plotting the response as a function of velocity where the pulse repetition rate is uniform. Curve 35 is for the condition where the number of pulses per object N is less than the critical number $N_c$, curve 36 for the condition where the number of pulses per object is equal to the critical number, and curve 37 where the number of pulses per object greatly exceeds the critical number. It will be evident from curves 36 and 37 that for certain ratios between the number of pulses per object and the critical number, as the velocity is increased, there exists blind velocities at which no response is obtained. To overcome this defect the pulse repetition rate may be frequency modulated with a sinusoidal modulation and the response as a function of velocity becomes as is shown in Fig. 6 wherein zero response regions are eliminated. Frequency modulation of the pulse repetition rate may be accomplished by conventional means.

Thus while there has been shown what is at present considered a preferred embodiment of the invention, it will be obvious that many changes and modifications may be made therein. For example, in Fig. 1 a coherent oscillator 17 is employed to provide video signals whose amplitude varies as a function of the radial component of object velocity. The invention is also operable however in a system where the signal obtained from fixed objects provides coherent oscillations which beat with the signal from a moving object to provide the desired video pulses. It is also to be understood that while the invention has been described in connection with an indicator adapted to afford a "B" type presentation, other types of presentation such as Plan Position Indication (PPI) may be employed with equal success providing that successive traces overlap in the required manner.

Accordingly it is intended in the accompanying claims to cover all such changes and modifications that fall within the true spirit and scope of the invention.

The invention claimed is:

1. A radio object-locating system comprising means for transmitting successive exploratory pulses of high frequency oscillations including antenna means for cyclically scanning a region, means for frequency modulating the repetition rate of said exploratory pulses, means for obtaining reference oscillations synchronized in fixed phase with said high frequency oscillations of the exploratory pulses, means for receiving echo pulses from stationary and moving objects, means for combining said reference oscillations and said echo pulses to obtain corresponding video pulses, each respective reflecting object within range of the system in the course of an antenna scanning cycle being manifested by a respective train of video pulses, successive video pulses within each respective train originating from successive exploratory pulses, a pulse-operated cathode-ray indicator having a fluorescent screen, switch means operative in synchronism with the transmission of successive exploratory pulses for reversing the polarity of alternate pulses in each respective train of video pulses, means for intensity modulating the beam of said indicator with said train of video pulses, means to sweep said beam in one direction to provide a range trace on said screen, means for continuously displacing said sweep to indicate the azimuth of reflecting objects, said beam being wider than the distance between successive traces, whereby successive traces on said screen overlap, and means for normally maintaining said range trace at half illumination whereby a train of video pulses of fixed amplitude representing stationary objects is not discernible on said screen whereas a train of video pulses of varying amplitude representing moving objects is presented thereon.

2. A radio object-locating system comprising means for transmitting successive exploratory pulses of high frequency oscillations including antenna means for cyclically scanning a region, means for obtaining reference oscillations synchronized in fixed phase with said high frequency oscillations of the exploratory pulses, means for receiving echo pulses from stationary and moving objects, means for combining said reference oscillations and said echo pulses to obtain corresponding video pulses, each respective reflecting object within range of the system in the course of an antenna scanning cycle being manifested by a respective train of video pulses, successive video pulses within each respective train originating from successive exploratory pulses, a pulse-operated cathode-ray indicator having a fluorescent screen, switch means operative in synchronism with the transmission of successive exploratory pulses for reversing the polarity of alternate pulses in each respective train of video pulses, means for intensity modulating the beam of said indicator with said train of video pulses, means to sweep said beam in one direction to provide a range trace on said screen, means for continuously displacing said sweep to indicate the azimuth of reflecting objects, said beam being wider than the distance between successive traces, whereby successive traces on said screen overlap, and means for normally maintaining said range trace at half illumination whereby a train of video pulses of fixed amplitude representing stationary objects is not discernible on said screen whereas a train of video pulses of varying amplitude representing moving objects is presented thereon.

3. In a radio object locating system of the character described wherein exploratory pulses are transmitted and video pulses are derived from echoes received, each respective reflecting object within range of the system in the course of an antenna scanning cycle being manifested by a respective train of video pulses, successive video pulses within each respective train originating from successive exploratory pulses, apparatus comprising a pulse-operated cathode-ray indicator having a fluorescent screen, switch means operative in synchronism with the transmission of successive exploratory pulses for reversing the polarity of alternate pulses only in each respective train of video pulses, means for intensity modulating the beam of said indicator directly with said train of video pulses, means adapted to sweep said beam in one direction to provide a range trace on said screen, means for continuously displacing said sweep to indicate the azimuth of reflecting objects, said beam being wider than the distance between successive traces, so that successive traces on said screen overlap preceding traces, and means for normally maintaining said trace at half illumination.

4. In a radio object-locating system of the character described wherein exploratory pulses are transmitted and video pulses are derived from echoes received, each respective reflecting object within range of the system in the course of an antenna scanning cycle being manifested by a respective train of video pulses, successive video pulses within each respective train originating from successive exploratory pulses, apparatus comprising a pulse-operated cathode ray indicator having a fluorescent screen, switch means operative in synchronism with the transmission of successive exploratory pulses for reversing the polarity of alternate pulses only in each respective train of video pulses, means for directly applying said train of video pulses as intensity modulation on the cathode-ray beam of said indicator, means for normally maintaining said cathode ray beam at half intensity.

5. In a radio object-locating system of the character described wherein exploratory pulses are transmitted and video pulses are derived from echoes received, each respective reflecting object within range of the system in the course of an antenna scanning cycle being manifested by a respective train of video pulses, successive video pulses within each respective train originating from successive exploratory pulses, apparatus comprising switch means operative in synchronism with the transmission of successive exploratory pulses for reversing the polarity of alternate pulses only in each respective train of video pulses, and means connected to said last-named means for indicating the average amplitude of the pulses of each train of video pulses.

6. A radio object-locating system comprising means for transmitting successive exploratory pulses of high frequency oscillations including antenna means for cyclically scanning a region, means for frequency modulating the repetition rate of said exploratory pulses, means for obtaining reference oscillations synchronized in fixed phase with said high frequency oscillations of the exploratory pulses, means for receiving echo pulses from stationary and moving objects, means for combining said reference oscillations and said echo pulses to obtain corresponding video pulses, each respective reflecting object within range of the system in the course of an antenna scanning cycle being manifested by a respective train of video pulses, successive video pulses within each respective train originating from successive exploratory pulses, switch means operative in synchronism within the transmission of successive exploratory pulses for reversing the polarity of alternate pulses in said train of video pulses, and means connected to each respective last-named means for indicating the average amplitude of the pulses of each train of video pulses.

7. A radio object-locating system comprising means for transmitting successive exploratory pulses of high frequency oscillations including antenna means for cyclically scanning a region, means for receiving a train of echoes of a train of said successive exploratory pulses from each respective stationary and moving object, means for deriving video pulses from said echoes including means for deriving from each respective moving object train of echoes a train of video pulses varying in amplitude, a pulse-operated cathode-ray tube, switch means operative in synchronism with the transmission of successive exploratory pulses for reversing the polarity of alternate pulses only in each respective train of video pulses, means for intensity modulating the electron beam of said cathode ray tube directly with said train of video pulses, means to sweep said beam in synchronism with said antenna, and means for normally maintaining said electron beam at an intermediate intensity.

8. A radio object-locating system comprising means for transmitting successive exploratory pulses of high frequency oscillations including antenna means for cyclically scanning a region, means for obtaining coherent reference oscillations synchronized in fixed phase with said high frequency oscillations of the exploratory pulses, means for receiving echo pulses from stationary and moving objects, means for combining said reference oscillations and said echo pulses to obtain corresponding video pulses, each respective reflecting object within range of the system in the course of an antenna scanning cycle being manifested by a respective train of video pulses, successive video pulses within each respective train originating from successive exploratory pulses, a pulse-operated cathode-ray indicator having a fluorescent screen, switch means operative in synchronism with the transmission of successive exploratory pulses for reversing the polarity of alternate pulses in said train of video pulses, means for intensity modulating the beam of each respective indicator with said train of video pulses, means to sweep said beam in one direction to provide a range trace on said screen, means for continuously displacing said sweep in synchronism with said antenna to indicate the azimuth of reflecting objects, said beam being wider than the distance between successive traces, so that a predetermined number of successive traces on said screen overlap, and means for normally maintaining said range trace at an intermediate illumination whereby only trains of video pulses representing moving objects having a predetermined range of velocities relative to said system are presented on said fluorescent screen.

9. A radio object-locating system comprising means for transmitting successive exploratory pulses of high frequency oscillations, means for frequency modulating the repetition rate of said exploratory pulses, means for receiving echo pulses from stationary and moving objects and deriving video pulses therefrom, each respective reflecting object within range of the system in the course of an antenna scanning cycle being manifested by a respective train of video pulses, successive video pulses within each respective train originating from successive exploratory pulses, a cathode-ray indicator having a fluorescent screen, switch means operative in synchronism with the transmission of successive exploratory pulses for reversing the polarity of alternate pulses only in each respective train of video pulses, means for intensity modulating the beam of said indicator directly with said train of video pulses, means to sweep said beam in one direction to provide a trace on said screen, said beam being wider than the distance between successive traces, so that a predetermined number of fluorescent spots on said screen produced by successive video pulses overlap, and means for normally maintaining said trace at an intermediate illumination whereby only trains of video pulses representing moving objects are presented on said fluorescent screen.

10. A radio object-locating system comprising means for transmitting successive exploratory pulses of high frequency oscillations including antenna means for cyclically scanning a region, means for frequency modulating the repetition rate of said exploratory pulses, means for receiving echoes of said successive exploratory pulses from stationary and moving objects and deriving a train of video pulses from each reflecting object within the range of the system in the course of an antenna scanning cycle, successive video pulses within each respective train originating from successive exploratory pulses, a pulse-operated cathode-ray indicator having a fluorescent screen, switch means operative in synchronism with the transmission of successive exploratory pulses for reversing the polarity of alternate pulses only in each respective train of video pulses, means for intensity modulating the electron beam of said indicator directly with said train of video pulses, means to sweep said beam in one direction to provide a range trace on said screen, means for continuously displacing said sweep to indicate the azimuth of reflecting objects, said beam being wider than the distance between successive traces so that successive traces on said screen overlap, and means for normally maintaining said range trace at an intermediate illumination.

References Cited in the file of this patent

UNITED STATES PATENTS

| Number | Name | Date |
| --- | --- | --- |
| 2,402,464 | Suter | June 18, 1946 |
| 2,406,316 | Blumlein et al. | Aug. 27, 1946 |
| 2,406,358 | Doba, Jr. | Aug. 27, 1946 |
| 2,407,000 | Evans | Sept. 3, 1946 |
| 2,422,135 | Sanders, Jr. | June 10, 1947 |
| 2,480,038 | Mason | Aug. 23, 1949 |
| 2,485,583 | Ginzton | Oct. 25, 1949 |
| 2,491,450 | Holmes | Dec. 13, 1949 |
| 2,512,144 | Emslie | June 20, 1950 |
| 2,532,546 | Forbes | Dec. 5, 1950 |
| 2,548,405 | Snyder, Jr. | Apr. 10, 1951 |
| 2,595,876 | Norgaard | May 6, 1952 |